Figure 1:
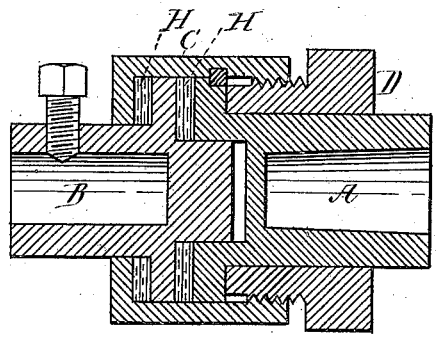

(No Model.)

J. G. BLOUNT.
CHUCK.

No. 299,334. Patented May 27, 1884.

WITNESSES
Lewis C. Norton
Geo. O. G. Goale

INVENTOR
John G. Blount

UNITED STATES PATENT OFFICE.

JOHN G. BLOUNT, OF BOSTON, MASSACHUSETTS, ASSIGNOR OF ONE-HALF TO LEWIS C. NORTON, OF SAME PLACE.

CHUCK.

SPECIFICATION forming part of Letters Patent No. 299,334, dated May 27, 1884.

Application filed June 23, 1883. (No model.)

*To all whom it may concern:*

Be it known that I, JOHN G. BLOUNT, of Boston, in the county of Suffolk and State of Massachusetts, have invented a certain new and useful Improvement in Chucks for Lathes and Like Purposes, of which the following is a specification.

In turning or tapping the tool is sometimes broken, owing to the fact that it has met with some unlooked-for obstruction in the material, which, striking the tool suddenly, twists it out of shape or breaks it off short. Sometimes, too, in tapping, especially, the work is spoiled, owing to the fact that the turner has allowed his tool to run too deep into the hole. The object of my invention is to prevent any such occurrence; and I accomplish my object by making the chuck or head-stock of two parts, one adapted to fit the lathe-spindle and be as much a part of it as the chucks now in use, the other part being of suitable shape to hold the tool or the work, the two being suitably connected together, and so bound together that they will operate together by means of the friction between them, unless the resistance caused by the operation of the tool upon the work exceeds a definite amount, in which case one part will remain stationary and the other will move.

It is obvious that a chuck of this kind may be used in a variety of kinds of work, whether it is to rotate or remain stationary. It is also obvious that the friction necessary may be applied in a variety of ways across the axis of the chuck, around the axis of the chuck, &c.

I have described below, and shown in the drawings, modifications of my invention which are to be the subject-matter of other applications for Letters Patent, and hence are not claimed specifically herein.

In the drawings three forms of chucks are shown, each embodying my invention in a way suitable and convenient for use.

Figure 2:
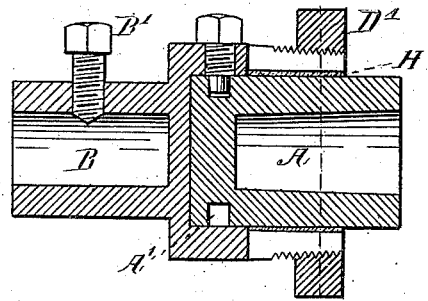
Figure 3:
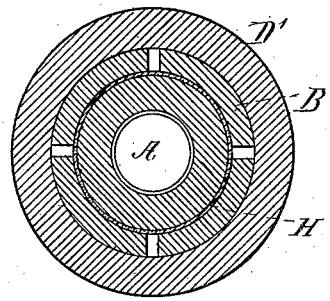
Figure 4:
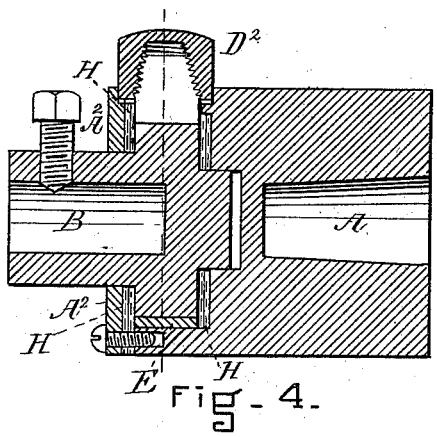
Figure 5:
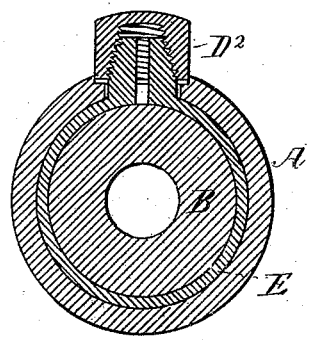

Figures 1, 2, and 4 are longitudinal sections of such chucks, and Figs. 3 and 5 are cross-sections of the forms shown in Figs. 2 and 4, respectively. In Fig. 1 the friction is applied in a plane at right angles to the axis of the chuck, in the form shown in Figs. 2 and 3 the friction is applied around the axis of the chuck, and in the form shown in Figs. 4 and 5 the friction is applied in both directions.

In each of these drawings, A is the part adapted to fit upon the lathe-spindle or tail-stock, and B the part for holding the tool or work. Of course the socket of each of these parts should be made of such a shape that it will answer the purpose for which it is intended—*i. e.*, fit the lathe-spindle or tail-stock or clamp the tool or work, suitable binding-screws being provided, if thought best. These parts may be fastened together either by friction alone or by any other means which will not interfere with the rotation of the movable part when the friction has been overcome. In Fig. 1 they are joined by a shell, C, which fits over the part B and binds it against the part A by means of the nut D, the shell being doweled to the part A, so as to prevent any danger of the nut unscrewing, and so changing the adjustment. In this case friction may be increased or diminished by screwing up or unscrewing the nut D in the shell C, the degree of friction being caused by the tightness with which the parts A and B and the washers (indicated at H) are held together. The washers are not necessary for the proper working of the chuck, although very desirable. If they are not used, it is evident that the rim of the piece B or the shell C and the nut D must be differently proportioned, so that the rim can be held securely between the piece A and the shell C. In Figs. 2 and 3 they are held together by the screw B' and groove A', extending around the piece A, in which the screw B' may rotate with the piece B. In this case the portion of the piece B which surrounds the piece A is slotted, beveled, and threaded, and adapted to be bound against the part A by the adjusting-nut D', thus giving the desired friction.

In Figs. 4 and 5 the parts are joined together by the washer A², which is screwed onto the end of the piece A, and provides the friction across the axis, the friction depending upon the tightness with which this washer binds the pieces A and B together. In this form of chuck friction around the axis is provided by the spring-clamp E, provided with a split nipple beveled and threaded, and is adjusted by the nut $D^2$. In putting this chuck together the spring-clamp E lies around the piece B and inside of the piece A, (see Fig. 5,) the washer $A^2$ holding it and the piece B in place.

The above seems to me now the simplest and best form of chuck embodying my invention, though the same results can be accomplished in a variety of ways. In all cases, whenever friction is required, it is best that some material shall be used, either in the form of a washer or strip, to take the wear from the chuck itself. I prefer rawhide for the purpose, and have shown in the drawings where it is best applied in each of these forms of chuck, the raw hide or other material being indicated at H.

To put my chuck into operation, I adjust it by means of the nuts and screws above referred to, so that it will withstand a strain a few pounds greater than is necessary in the ordinary run of the work which is to be done. In setting the lathe in motion, when, for example, the tool, which we will suppose has been stationary, is struck by an unusually hard flaw in the revolving work, the friction in the chuck will be overcome and the tool and work will rotate together. The turner, seeing this, will stop his lathe and get over his difficulty as he can. Without the use of my chuck in the case above described, the tool would probably be rendered unfit for use or the work spoiled.

The chuck is applicable for many kinds of work, light as well as heavy, for watch-makers' lathes and machinists' lathes as well.

What I claim as my invention, is—

1. The chuck above described, consisting of the parts A and B, the one adapted to be attached to and form a part of the lathe-spindle and the other to carry the work or tool, the two being held together by means of one or more friction-clamps, each provided with suitable means of adjustment, all substantially as and for the purposes set forth.

2. In a chuck, the combination of the piece A, forming a part of the lathe-spindle, and the piece B, adapted to hold the work or tool with a suitable clamp and one or more set-screws, the said pieces abutting against each other, and the said clamp and set-screws serving to hold said pieces together and regulate the friction between said abutting surfaces, all substantially as described.

3. In a chuck, the combination of the piece A, forming a part of the lathe-spindle, and the piece B, adapted to hold the work or tool, with a suitable clamp and one or more set-screws, the said pieces being suitably connected, as described, and free to rotate independently of each other, and the said clamp and set-screws serving to regulate the friction between said pieces, all as set forth.

In testimony whereof I have hereunto subscribed my name this 20th day of June, 1883.

JOHN G. BLOUNT.

Witnesses:
LEWIS C. NORTON,
GEORGE O. G. COALE.